Figure 1:
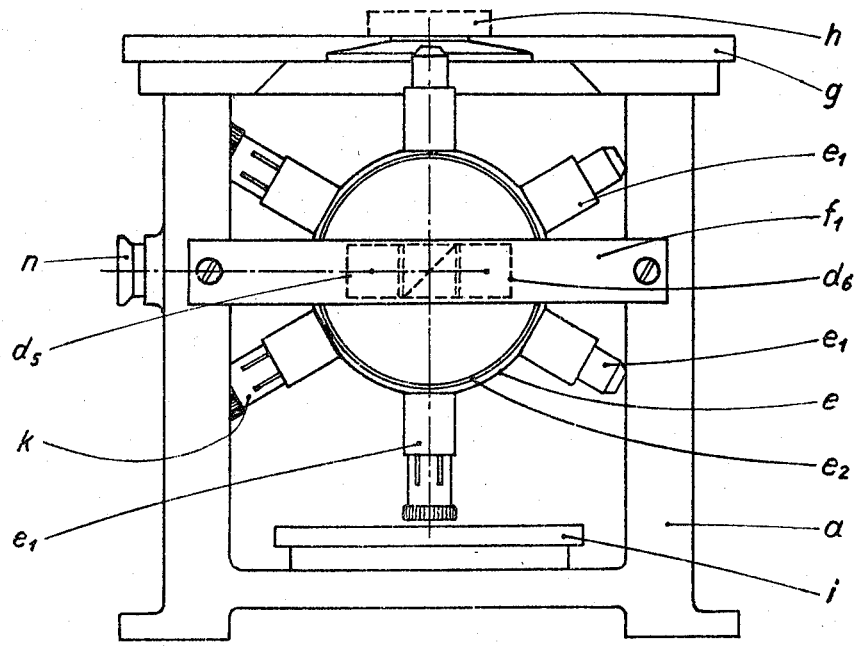

Inventor:

United States Patent Office 2,732,760
Patented Jan. 31, 1956

2,732,760

INTERFERENCE MICROSCOPE FOR EXAMINATION OF THE SURFACE QUALITY OF SOLID BODIES

Kurt Räntsch, Heidenheim (Brenz), Germany, assignor to Carl Zeiss, Heidenheim (Brenz), Germany Application July 28, 1951, Serial No. 239,047

Claims priority, application Germany August 16, 1950

3 Claims. (Cl. 88—39)

For the examination of the surface polish of solid opaque bodies, particularly of finely worked surfaces, interference microscopes have been used. In these microscopes a light beam is divided into two by a beam splitter, one of the split beams being reflected at the surface under test and the other split beam being reflected at a comparison surface, an objective being provided in the path of each split beam through which the respective split beam passes when travelling to and from the respective surface, both beams after reflection being recombined at the beam splitter so that they interfere with one another. The interference fringes are observed through an ocular, a magnified image of the surfaces examined being visible at the same time. In order to make possible the formation of the interference fringes, the two objectives must possess equal optical characteristics, especially equal focal length. If therefore for better observation one wants to change the magnification, then both objectives must be changed.

To be able to carry out this exchange in simple manner, there are provided in such microscopes according to the invention several pairs of cooperating microscope objectives, of which the two cooperating microscope objectives of each pair are of equal focal length and are so arranged at diametrically opposite parts of a rotatable holder symmetrically with respect to the rotary axis thereof and with their optical axes coinciding and perpendicular to said axis so that such objectives can be selectively positioned in the respective paths of the split beams. Thereby one is in a position, by simply turning said member to change the magnification and thereby select the favorable magnification for the observation. The comparison surface used for production of the interference fringes will in general not always be the same; one will select the reflecting power of this surface in accordance with the surface to be tested. It is advisable therefore to install each such comparison surface in a cap, which can be attached in simple manner to the respective objective, for example by slipping on or screwing on. For the rest the unit construction of such an interference microscope can be chosen as desired. Since in surface examinations objects with large dimensions frequently come into consideration, it is expedient to provide two supporting stages, arranged so that one can observe the upper surface of the test sample in customary manner on one stage located below the microscope or, according to the arrangement of Le Chatelier, the lower surface of the test sample located on the other table above the microscope. Since a mirror serving as the comparison surface is connected with the respective microscope objective, a simple turning of the objective holder suffices to switch from the one method of observation to the other.

Figure 2:
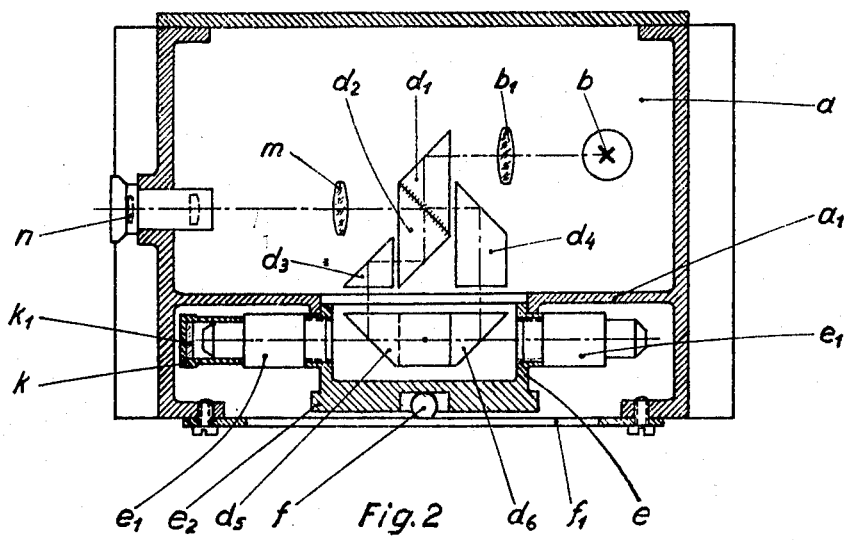

As an example of the invention an interference microscope with three objective pairs is represented in the accompanying drawing. Fig. 1 is a view seen from the side of the objective holder. Fig. 2 shows a horizontal section of the instrument at the level of the rotary axis of said holder. Parts incidental to the invention are only schematically represented or omitted. An essentially rectangular metal housing $a$ possesses in the interior a vertical wall $a_1$ which separates the front space containing the objective revolver from the space in which the other optical parts are located. The light from a light source $b$ passes through a condenser system $b_1$ into a system of prisms $d_1$, $d_2$, $d_3$, $d_4$, $d_5$, and $d_6$, which are mounted in suitable manner in the interior of the housing. The prisms $d_1$ and $d_2$ are cemented together. The cemented surface of the resulting prism is semireflecting and splits the light beam into two. The two split beams then pass through the prisms $d_3$ and $d_4$ respectively to the prisms $d_5$ and $d_6$ being cemented together with their surfaces lying at 45° inclined to the plane drawing of Fig. 2 and perpendicular to the drawing plane of Fig. 1. In the cemented surface a non-light transmitting metallic layer is applied, which conducts the light beams arriving from both sides in opposite direction perpendicular to the plane of drawing of Fig. 2. The two prisms $d_5$ and $d_6$ are mounted in a cylindrical body $e$, which constitutes the objective holder. It is mounted so as to be rotatable in the opening of the wall $a_1$ and is held in its adjusted position by a ball $f$ pressing upon a spring strip $f_1$ attached to the housing $a$. The objective holder $e$ carries six microscope objectives $e_1$ with equal dimensions, of which each pair of diametrically opposite objectives are of equal focal length. The objectives are disposed with their axes orthogonal to the rotary axis of member $e$. The focal lengths of the three pairs of objectives are different and are so chosen that a suitable range of magnification can be obtained. Through suitable catches, which are not indicated in the drawing, the vertical position of one of the objective pairs is ensured for the time being. In Fig. 2, for the sake of clarity, the objective holder $e$ is represented turned by 90° as compared with its position in Fig. 1, in order that an objective pair appears in the plane of the drawing. For convenient rotation of the holder $e$, it is provided with a knurled knob $e_2$. On the upper side of the instrument is provided a stage $g$ for the reception of objects to be tested, for example a test object $h$, indicated with broken lines, according to the method introduced by Le Chatelier whereby the lower surface of a test object can be examined. Moreover a second stage $i$ is provided below the holder $e$ for examining the upper surface of the test object. Both stages $g$ and $i$ can be constructed in the usual manner and provided with a height adjustment for focusing. On each of the microscope objectives which are turned off from the test object, a cap $k$ is detachably mounted, in which cap is fitted a mirror $k_1$ serving as a comparison surface. The light beams after having been reflected from the test body surface and the comparison mirror surface back to the semi-transparent metallic layer $d_5$, $d_6$ are directed by prisms $d_3$; $d_2$ and $d_4$; $d_1$ respectively through an objective $m$ into an ocular $n$, in which the interference fringes, and an image of the surface under test, are visible to the eye.

I claim:

1. An interference microscope for examining the surface quality of solid bodies comprising in a housing a light source, a light partially reflecting and partially transmitting surface for splitting a light beam from said source into two coherent beams, a plurality of pairs of cooperating microscope objectives, each pair of objectives having equal optical properties as regards magnification and aperture, the said optical properties however differing from pair to pair, and an objective revolver disc pivoted rotatable about an axis and receiving said pairs of objectives with their optical axes aligned radially in a plane normal to said revolving axis, the objectives of each said pair lying opposite one another, means for rotating said objective revolver to bring any desired said objective pair into position of use, reflecting means disposed between said splitting surface and the respective said pair of cooperating objectives in use to direct each one of said coherent split beams into one objective of said pair in use, a standard comparison mirror surface being associated with and disposed normal to the axis of and lying in the outer focal plane of one objective of said pair of objectives in use, the surface of the said object under test disposed normal to the axis of and lying in the outer focal plane of the other objective of said pair of objectives in use, said reflecting means being disposed to reflect the respective said partial beams, reflected from said standard comparison mirror surface and said test body surface back through said objectives in use, to said partially reflecting and partially transmitting surface such that the said beams reflected from said standard mirror and test body surfaces respectively are partially reflected and partially transmitted and recombined in one coincident path of light, and means forming an image of the interference effects of said recombined partial beams.

2. In an interference microscope according to claim 1, a plurality of standard comparison mirrors and a plurality of caps for receiving said mirrors, each cap being attached to the respective said objective of each one of said objective pairs.

3. In an interference microscope according to claim 1, the said objective revolver being pivoted rotatable about a horizontal axis such as to have the objectives rotated in a vertical plane, and two supporting stages the one located in the upper portion of said housing and the other said stage located in the lower portion of said housing, both said stages serving for receiving the said test body either for purposes of examining its lower or upper surfaces respectively as desired.

References Cited in the file of this patent

UNITED STATES PATENTS

| 1,987,776 | Hauser | Jan. 15, 1935 |
| 2,151,631 | Williams | Mar. 21, 1939 |

FOREIGN PATENTS

| 718,433 | Germany | Mar. 12, 1942 |
| 64,733 | Denmark | Aug. 26, 1946 |

OTHER REFERENCES

Industrial Diamond Review, vol. 6, September 1946, pages 276 through 279; article entitled "Interference Microscope for Testing Surfaces."